Feb. 28, 1933. F. W. GODSEY, JR 1,899,193
VEHICLE DRIVING APPARATUS AND SYSTEM
Filed Aug. 19, 1929
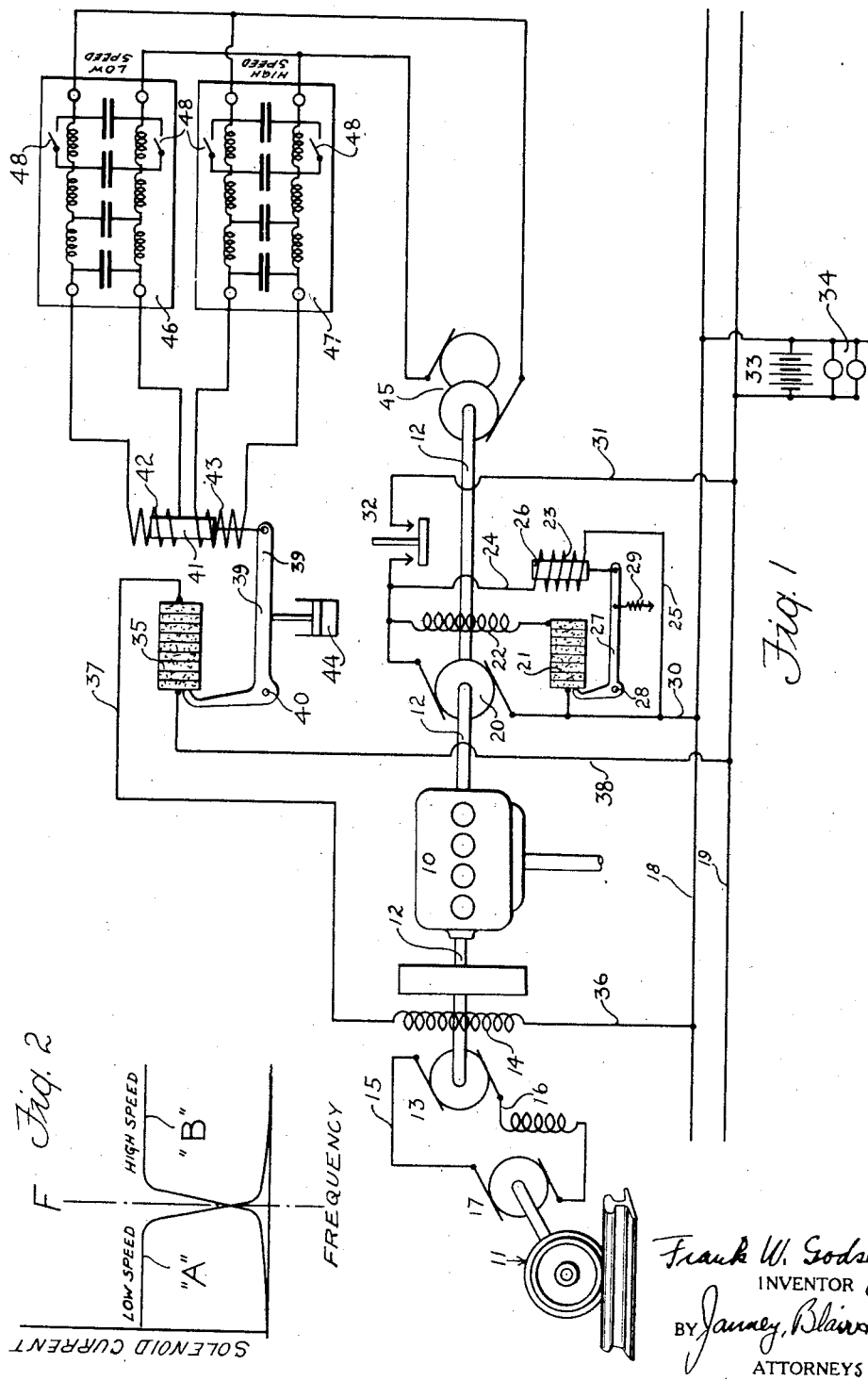
Frank W. Godsey, Jr.
INVENTOR
BY Janney, Blair & Curtis
ATTORNEYS Patented Feb. 28, 1933

1,899,193

UNITED STATES PATENT OFFICE

FRANK W. GODSEY, JR., OF NEW HAVEN, CONNECTICUT, ASSIGNOR TO THE SAFETY CAR HEATING & LIGHTING COMPANY, A CORPORATION OF NEW JERSEY

VEHICLE DRIVING APPARATUS AND SYSTEM

Application filed August 19, 1929. Serial No. 387,050.

This invention relates to the transmission of power and more particularly to the transmission of power from a source of motive power to a varying load, such as in the driving of a vehicle by means, for example, of a gas or oil engine.

One of the objects of this invention is to provide a practical and dependable system and apparatus for the transmission of power, that will be of highly efficient action and well adapted for hard practical use. Another object is to provide a simple and dependable apparatus for controlling the transmission of power from a source of driving energy to a variable load that will permit the maintenance of certain desirable characteristics in the operation of the source of driving energy. Another object is to provide an electrical speed-regulating apparatus that will be of simple construction, thoroughly dependable in action, and capable of operation with a minimum of manual attention. Other objects will be in part obvious or in part pointed out hereinafter.

The invention accordingly consists in the features of construction, combinations of elements, and arrangement of parts as will be exemplified in the structure to be hereinafter described and the scope of the application of which will be indicated in the following claims.

In the accompanying drawing in which is shown one of various possible embodiments of this invention, Figure 1 shows diagrammatically a preferred embodiment of my invention, and Figure 2 shows graphically a preferred form of operating characteristic of certain parts of my apparatus.

Referring now to the drawing and more particularly to Figure 1, there is shown at 10 an internal combustion engine as illustrative, with respect to certain features of my invention, of a means for driving a load, and as illustrative of a variable load to be driven by the engine 10, I have diagrammatically shown a wheel and axle 11 of a vehicle, the engine 10 and related parts to be hereinafter more clearly described being carried by the vehicle of which the wheel and axle 11 are a part.

The shaft 12 of the engine 10 drives a generator 13, the exciting field winding of which is indicated at 14. The output of the generator 13 is supplied by conductors 15—16 to one or more motors 17, preferably of the series type, suitably connected to drive the wheel or wheels 11 of the vehicle. Any suitable connecting or control mechanism may be interposed in the conductors 15 and 16 between the generator 13 and the motor 17.

The generator 13, which is preferably a direct current generator, has its field winding 14 supplied with excitation current from a train line 18—19 which, in turn, is supplied with energy by a generator 20 also driven by the engine 10 and connected to the shaft 12 thereof in any suitable manner.

The generator 20 is provided with any suitable regulating mechanism for maintaining preferably its voltage substantially constant even though the speed of drive of the generator 20 may vary. Conveniently, this regulating mechanism takes the form of a variable resistance 21, preferably in the form of a compressible carbon pile connected in circuit with the shunt field winding 22 of the generator 20; the pressure on the carbon pile 21 is controlled by a winding 23 connected across the terminals of the generator 20 by conductors 24—25, so as to be responsive to the voltage of the generator 20. This winding 23 acts upon a movable core 26, connected to a bell crank lever 27 which is pivoted at 28, and one arm of which engages the free or unanchored end of the carbon pile 21. The regulating coil 23 acts in opposition to a spring 29, preferably adjustable, and thus varies the excitation of the generator 20 to maintain the voltage thereof substantially constant.

The generator 20 is connected by conductors 30—31 to the train line 18—19, but preferably through an automatic switch generally indicated at 32, the latter being of any suitable construction and adapted to disconnect the generator 20 from the train line 18—19 should the speed of the generator 20 decrease below a critical value, and to connect the generator 20 to the train line 18—19 upon the speed and voltage of the generator 20 arriving at suitable operating values. Such operations of the automatic switch 32 as have just been noted take place upon the stopping and starting of the transmission apparatus.

Various auxiliary devices may be operated from the train line 18—19 and by way of illustration I have shown a storage battery 33 and lamps 34 as being supplied with current from the generator 20. The latter may thus serve to maintain the battery 33 in a charged condition, while the battery 33 conveniently acts to supply the train line with energy should the engine 10 and hence the generator 20 be brought to a stop.

The exciting field winding 14 of the main generator 13 is, as above noted, connected across the train line 18—19, but the excitation of the generator 13 is controlled preferably by varying the energization of the field winding 14 and preferably by inserting directly in the circuit thereof a variable resistance conveniently in the form of a carbon pile 35. The circuit of the field winding 14 will thus be seen to extend from the train line conductor 18, conductor 36, field winding 14, conductor 37, carbon pile 35, and thence by way of conductor 38 to the other train line conductor 19.

The pressure of the carbon pile 35, and hence the resistance that the latter interposes in the circuit of the field winding 14 of the main generator 13, is fixed by means of a bell crank lever 39 pivoted as at 40 and having one arm thereof extending into engagement with the free or unanchored end of the pile 35. The other arm of the lever 39 has connected to it a core 41 which is acted upon by two windings 42 and 43 so related to the core 41 that they have opposing effects upon the core 41. Thus, energization of coil 42 tends to pull the core 41 upwardly and hence to relieve the pressure on the carbon pile 35 and hence to increase the resistance in the circuit of the field winding 14; winding 43 tends to pull the core 41 downwardly and thus to increase the pressure on the carbon pile 35, and hence to decrease the resistance of the circuit of the field winding 14. A dash-pot 44, conveniently connected to the lever 39, acts to steady or damp the movements of the lever 39 in response to the action therein of the coils 42—43.

Coils 42 and 43 are energized by an alternating current, the frequency of which varies with changes in speed of the engine 10 and parts driven thereby, and conveniently, this source of alternating current comprises an alternator 45 driven from the shaft 12 in any suitable manner. The speed of the rotating element of the alternator 45 is thus made to partake of any changes in speed of rotation of the engine 10 and parts driven thereby and thus the frequency of the output of the alternator 45 varies with the speed of the engine 10.

Considering now in detail the circuits of coils 42 and 43, it is to be noted that there is interposed in the circuit of each of these coils a filter circuit having such characteristic as will vary the action of the corresponding coil in accordance with change in frequency of the alternator 45. The filter interposed in the circuit of coil 42 is generally indicated at 46 and the filter interposed in the circuit of coil 43 is generally indicated at 47. These filters comprise any suitable arrangement of inductances and condensers, a possible arrangement of which is diagrammatically indicated in the drawing, as will give the filter circuit the desired characteristics.

The inductances and capacities of filter 46 are so proportioned with respect to each other and so inter-related that the resultant filter circuit offers a low impedance to all frequencies below that frequency, of the alternator 47, that corresponds to the intended speed of operation of the engine 10 and parts driven thereby. In Figure 2 of the drawing curve A represents the current flow of the coil 42, but through the filter 46 as the frequency changes, the critical frequency, or the frequency corresponding to the intended speed of operation of the engine 10 and related parts being indicated at F.

The filter 47 has its parts so proportioned and inter-related that it offers low impedance to currents of frequencies above the above-mentioned critical value, and in Figure 2 of the drawing curve B shows the current-carrying characteristic of filter 47 with change in frequency. Curves A and B cross each other, as clearly appeared in Figure 2, and preferably the characteristics of the two filters are such that the change in impedance at or adjacent the critical frequency is not too abrupt and approximately on the order as is graphically indicated in Figure 2.

Assuming now that the engine 10 is operating at its intended speed, the various movable parts of the apparatus may be considered as being in the positions shown in Figure 1 of the drawing; the output of the generator 13 is supplied to the motor 17 which, as above noted, is connected to the load illustratively shown in the form of the driving wheel or wheels of a vehicle, such as a locomotive. Let it be further assumed that the engine 10 is thus operating for a given setting of the throttle valve thereof, and hence for a given fuel input thereto; under these conditions, and at the corresponding speed of operation of the engine 10, the total output of the generator 13 is being transmitted to the load 11 by way of the motor 17.

With the engine 10 thus running at the intended speed, the frequency of the current output of the alternator 45 will be at critical frequency F indicated in Figure 2 of the drawing, and as is clear from the characteristics A and B of Figure 2, the impedance offered by the two filters 46—47 to currents of this critical frequency is the same, and the energizing current supplied to the coils 42—43 will correspondingly be equal. The coils 42 and 43, as above noted, however, act in opposite directions from the core 41 and the latter, and hence, also, lever 39, will remain in a position of rest or equilibrium. Any departure from this equal energization of the two coils results at once in actions that rectify the inequality of energization of the two coils, as will now be made clear.

If, however, the load increases, for example, due to the vehicle or locomotive striking an up-grade in its path of travel, the load on the power transmission between the wheel 11 and the engine 10 correspondingly increases and the engine 10 begins to slow down, thus correspondingly diminishing the frequency of the current output of the alternator 45. The frequency of the current thus supplied to the two coils 42—43 is correspondingly diminished, but the magnitudes of the currents supplied to the two coils are changed, as will be clear by reference to Figure 2. At the decreasing frequencies, that is, at frequencies departing downwardly from the critical frequency F, the impedance of the filter circuit 46 diminishes and the impedance of the filter circuit 47 increases. The current passed by the filter 36 to the coil 42 thus increases (as will be clear from curve A of Figure 2), while the current passed to the coil 43 through the filter circuit 47 decreases (as is clear from curve B of Figure 2).

Coil 42 is thus strengthened while coil 43 is weakened, coil 42 being thus enabled to move the lever 39 in a direction (counter-clockwise) to lessen the pressure on the carbon pile 35 and cutting down the excitation of generator 13 sufficiently to diminish the output of the generator 13, and hence to diminish the load on the engine 10 as will permit the speed of the latter to return to normal.

Should the engine 10 increase in speed beyond the speed corresponding to the critical speed F of Figure 2, a reverse action takes place, the current to coil 43 being now increased and the current to coil 42 being now decreased. Coil 43 is thus enabled to pull down on the core 41 and to swing the lever 39 in a direction (clockwise) to increase the pressure on the carbon pile 35, and thus to increase the excitation of generator 13 sufficiently to cause its increased output to increase the load on engine 10 as will cause the speed of the latter to diminish to the normal or critical speed.

Thus, departures from a frequency corresponding to that at which the engine 10 is intended or desired to be operated are made to achieve, through the action of the filter circuits, such changes in impedance of the circuits of the two coils 42—43 as will insure maintenance of the desired speed of operation of the engine 10 and related parts.

Should it be desired to cause the engine 10 to operate at a different speed, as might be the case for different throttle settings of the engine 10, the characteristics of the filters 46—47 are changed as by increasing or decreasing the number of inductance or capacity units that make up the respective filter circuits, thus to shift the characteristics A and B of Figure 2 in a direction toward the left or the right, as desired, and thus to shift the critical frequency F down or up the scale of frequencies. In Figure 1 of the drawing, I have indicated switches 48 for thus changing the effective combinations of inductances and capacities of the filters.

It will thus be seen that there has been provided in this invention a system and apparatus in which the several objects hereinbefore noted, as well as many thoroughly practical advantages, are successfully achieved. It will be seen that the apparatus is of simple construction, is of a thoroughly practical nature, and is well adapted to meet the conditions of hard practical use.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In apparatus of the character described, in combination, a prime mover, a generator, means forming an electrical load for receiving energy from said generator, means for controlling the power supplied to said load, means supplying an alternating potential varying in frequency with changes in the speed of said prime mover, electromagnetic means connected to be operated by said alternating potential and for controlling said power control means, a filter passing currents of substantial magnitude above a certain frequency, said filter being interposed between said source of alternating potential and said electromagnetic means, and a filter passing currents of substantial magnitude below a certain frequency, said filter being interposed between said source of alternating potential and said electromagnetic means.

2. In apparatus of the character described, in combination, a prime mover, a generator, means forming an electrical load for receiving energy from said generator, means for controlling the power supplied to said load, an alternator, the frequency of which varies with changes in speed of said prime mover, two coils for controlling said power control means and having opposing effects thereon, a filter interposed between one of said coils and said alternator, said filter having diminished impedance to currents above a certain frequency, a filter interposed between the other of said coils and said alternator, said filter having diminished impedance to currents below a certain frequency.

3. In apparatus of the character described, in combination, a prime mover, a generator, means forming an electrical load for receiving energy from said generator, means for controlling the power supplied to said load, means supplying an alternating current varying in frequency with changes in speed of said prime mover, means responsive only to increase in frequency above a certain value for operating said control means in one direction, and means responsive only to decreases in frequency below a certain value for operating said control means in the other direction.

4. In apparatus of the character described, in combination, a prime mover, a generator, means forming an electrical load for receiving energy from said generator, means for varying the excitation of said generator, means supplying an alternating current varying in frequency with changes in speed of said prime mover, means responsive to increases in frequency above a certain value for operating said excitation-varying means in a direction to increase the excitation of said generator, and means responsive to decreases in frequency below a certain value for operating said excitation-varying means in a direction to decrease the excitation of said generator.

5. In apparatus of the character described, in combination, a dynamo electric machine having a field circuit, a variable resistance for controlling said field circuit, two coils having opposing effects for controlling said variable resistance, means forming a source of alternating current varying in frequency with variation in speed of said machine, said source being connected to said two coils, a filter circuit interposed between one of said coils and said source and having diminished impedance to currents above a certain frequency, and a filter interposed between the other of said coils and said source and having diminshed impedance to currents below a certain frequency.

6. In apparatus of the character described, in combination, a dynamo electric machine having a field circuit, a variable resistance for controlling said field circuit, two coils having opposing effects for controlling said variable resistance, means forming a source of alternating current varying in frequency with variation in speed of said machine, said source being connected to said two coils, and means interposed between said coils and said source for diminishing the impedance to current flowing to one coil and increasing the impedance to current flowing to the other coil upon increase in frequency of the current from said source and for increasing the impedance to current flowing to said one coil and diminishing the impedance to current flowing to said other coil upon decrease in frequency of the current from said source.

7. In apparatus of the character described, in combination, motive means, means for varying the speed of drive of said motive means, means including two relay coils for controlling said speed-varying means, means including a selective network responsive to changes in speed of said motive means for increasing the effect of one coil and decreasing the effect of the other, and means for short-circuiting a portion of said selective network for changing the standard of operation of said last-mentioned means.

8. In apparatus of the character described, in combination, motive means, means for varying the speed of drive of said motive means, means including two relay coils for controlling said speed-varying means, means forming a source of alternating current the frequency of which varies with changes in speed of said motive means, said two coils being supplied with said alternating current, means interposed between one coil and said source of alternating current and offering increased impedance to current above a certain frequency, means interposed between the other of said coils and said source of alternating current and offering increased impedance to currents below a certain frequency, and means for changing the action of one of said last-mentioned means.

9. In apparatus of the character described, in combination, motive means, means for varying the speed of drive of said motive means, means including two coils for controlling said speed-varying means, means forming a source of alternating current the frequency of which varies with changes in speed of said motive means, said two coils being supplied with said alternating current, means interposed between one coil and said source of alternating current and offering increased impedance to currents above a certain frequency, means interposed between the other of said coils and said source of alternating current and offering increased impedance to currents below a certain frequency, and means for changing the action of both of said last-mentioned means.

10. In apparatus of the character described, in combination, a prime mover, a generator, means forming an electrical load for receiving energy from said generator, means for controlling the power supplied to said load, means supplying an alternating current varying in frequency with changes in speed of said prime mover, means responsive only to increases in frequency above a certain value for operating said control means in one direction, means responsive only to decreases in frequency below a certain value for operating said control means in the other direction, and means for changing the action of both of said last mentioned means.

11. In apparatus of the character described, in combination, a dynamo electric machine having a field circuit, a variable resistance for controlling said field circuit, two coils having opposing effects for controlling said variable resistance, and means including a selective network responsive to changes in speed of said dynamo electric machine for increasing the effect of one coil and decreasing the effect of the other.

12. In apparatus of the character described, in combination, a dynamo electric machine having a field circuit, a variable resistance for controlling said field circuit, two coils having opposing effects for controlling said variable resistance, means forming a source of alternating current varying in frequency with variation in speed of said machine connected to said coils, and means including a frequency selective network responsive to changes in speed of said dynamo electric machine for increasing the effect of one coil and decreasing the effect of the other.

In testimony whereof, I have signed my name to this specification this fourteenth day of August, 1929.

FRANK W. GODSEY, Jr.